Patented Oct. 5, 1954

2,691,044

UNITED STATES PATENT OFFICE 2,691,044

KETOL COMPOUNDS AND METHOD FOR MAKING SAME

Heinrich Kölling, Wuppertal-Elberfeld, and Hans Lettré, Heidelberg, Germany, assignors to Schenley Laboratories Inc., New York, N. Y.

No Drawing. Application March 27, 1951, Serial No. 217,878

Claims priority, application Germany March 29, 1950

3 Claims. (Cl. 260—590)

This invention relates generally to the production of therapeutically useful organic chemical compounds and, in a more particular sense, it is concerned with certain novel compounds that have the physiological activity and produce the therapeutic action of suprarenal cortical hormones, together with processes for making these compounds.

It is well known that certain suprarenal cortical hormones, such as corticosterone, desoxycorticosterone, cortisone and the like, can be isolated by appropriate treatment of animal suprarenal cortex, but these procedures have the disadvantages that the quantities of raw material available are restricted and the processes of extraction frequently result in destruction of the physiological properties of the hormones, with the result that the product obtained in this manner is extremely costly.

An object of the present invention is to provide materials having the therapeutic activity characteristic of the suprarenal cortical hormones, which may be obtained by synthetic routes that avoid the processing of natural products, heretofore thought necessary when producing this type of material.

A further object of the invention is to provide a process for manufacturing substances having the therapeutic properties of suprarenal cortical substances, which utilize, as starting materials, readily available organic chemical compounds.

Other objects of the invention will be apparent hereinafter.

In accordance with the present invention, synthetic compounds are obtained which, in terms of therapeutic activity, are equal to compounds such as corticosterone, desoxycorticosterone, cortisone, and the like, these new compounds being stilbane derivatives in which a ketol group, which may be acylated, is attached to one of the carbon atoms of the ethylene bridge. Stilbane-α-ketols are particularly preferred, especially those that are substituted, in one or both of the benzene nuclei, by hydroxy, alkoxy, alkoxymethoxy or acyloxy groups.

The ketol compounds of the present invention may be represented by the formula:

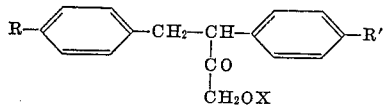

wherein R and R' are selected from the group consisting of hydrogen, hydroxyl, alkoxyl, alkoxymethoxy and acyloxy, and X is hydrogen or an acyl group.

The starting material for producing compounds of this type are the stilbane-α-carboxylic acids of the formula:

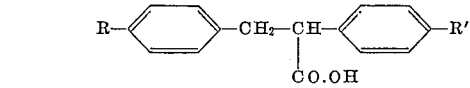

wherein R and R' are of the group consisting of hydrogen, hydroxyl-, alkoxyl-, alkoxy-, methoxy or acyloxy. These stilbane-α-carboxylic acids preferably are obtained by condensing a suitably substituted benzyl nitrile with a suitably substituted benzaldehyde to produce the correspondingly substituted α-phenyl cinnamic nitrile, hydrogenating this product to the α-phenyl-dihydro-cinnamic nitrile and then hydrolyzing this nitrile to the corresponding carboxylic acid.

The initial condensation is effected with suitably selected raw materials, preferably substituted in the para position by an alkoxy- or an alkoxymethoxy group, and the production of the hydroxy stilbane carboxylic acids is preferably carried out utilizing the alkoxymethyl ethers, because the dealkylation of other types of alkoxy compounds presents certain difficulties owing to the lability of the carboxylic group.

The aforesaid sequence of reactions is found to be more satisfactory than a sequence in which the saponification step precedes the hydrogenation step because it has been found that the α-phenyl cinnamic nitriles are only difficultly saponifiable, whereas the α-phenyl dihydro cinnamic nitriles can be converted substantially quantitatively into salts of the corresponding carboxylic acids by boiling with alcoholic solutions of caustic alkali. Amalgamated aluminum is found to be especially satisfactory as the reagent for producing hydrogen, by reaction with water, in the hydrogenation of the α-phenyl cinnamic nitriles and the hydrogenation product is obtained in substantially quantitative yields.

The compounds of this invention may be obtained from the corresponding stilbane-α-carboxylic acids, which may be produced as above described, by converting the latter into the corresponding halides, treating the halides with an excess of diazomethane in ethereal solution at a low temperature to produce the corresponding diazoketones, and converting the diazoketones, by reaction with acids, into the corresponding stilbanes-α-ketols or acyl derivatives thereof. The crystallized diazoketones may be recovered in good yield and, depending on their stability, may be converted into the ketols by reaction with aqueous alcoholic mineral acids, for instance, sulfuric acid in a mixture of water and methanol, or into the O-acyl compounds of these ketols by heating with organic acids.

The following stilbane-α-carboxylic acids may, for instance, be used as primary starting materials: α-phenyldihydro-cinnamic acid, α-phenyl-p-methoxy-dihydro-cinnamic acid, α-p-anisyl-p-methoxy-dihydro-cinnamic acid, α-phenyl-p-acetoxy-dihydro-cinnamic acid, α-phenyl-p-methoxymethoxy-dihydro-cinnamic acid and the like. After formation of the stilbane-α-ketol compounds having an acetoxy or methoxymethoxy group as a substituent, the acetoxy group may be hydrolyzed or the methoxymethoxy group may be dealkylated, to yield a product with a free phenolic hydroxyl group.

The stilbane-α-carboxylic acids mentioned above may be converted into the corresponding acid chlorides by treatment with thionyl chloride. By subsequent reaction of the acid chloride with diazomethane, in ethereal solution, at a temperature of or below 10° C. below zero, causes formation of the diazoketone, which crystallizes out gradually on standing in the cold. It is decomposed by treatment with mineral acid at room temperature, and the desired stilbane ketol then crystallizes from the solution.

If organic acids are used instead of mineral acids when decomposing the diazoketone, the corresponding stilbane ketol O-acyl compounds are obtained instead of the free ketol, and these compounds, also are obtained in crystalline form.

The invention is further illustrated by the following examples without being restricted thereto.

*Example 1*

Water is added, portionwise, to an ethereal solution containing equal parts by weight of α-phenyl-cinnamic nitrile and amalgamated aluminum grit at a rate such that a continual vivacious reduction is maintained. The ethereal solution is then filtered, the ether is evaporated, and the residue is recrystallized from methanol. α-Phenyl-dihydro-cinnamic nitrile, melting at 58° C., is thus obtained in substantially quantitative yield.

About 1 part by weight of the α-phenyl-dihydro-cinnamic nitrile so obtained is boiled under reflux for 12 hours with 4 parts by weight of sodium hydroxide in 70% aqueous methanol. A major portion of the methanol is evaporated and the residual solution is diluted with water. Small amounts of acid amide that may have separated during this operation are removed by filtering the solution, then it is acidified with concentrated hydrochloric acid, causing α-phenyl-dihydro-cinnamic acid to precipitate. The product, after recrystallization from a minimal quantity of methanol, is obtained in a yield of about 80% and melts at 90-91° C.

α-Phenyl-dihydro-cinnamic acid chloride is produced by heating the free acid, obtained as above described, with an excess of thionyl chloride in benzene. This acid chloride is then introduced into an ethereal diazomethane solution, causing formation of the corresponding diazoketone which, after evaporating the ether, is recrystallized from methanol. This product melts at 67° C. and is obtained in a yield of about 95%.

The diazoketone so obtained is introduced into a 0.05 N-sulfuric acid solution in a mixture of methanol and water, whereby stilbane-α-ketol, i. e., 1-hydroxy-2-oxo-3:4-diphenyl-butane, is formed within a few hours with evolution of nitrogen. This product is purified by evaporating the solution, extracting the ketol with ether, evaporating off the ether and distilling the extract at 157° C. under high vacuum, i. e. 1 mm. pressure. The pure product, which is a liquid at room temperature, is thus obtained in a yield at 80%.

*Example 2*

By treating α-phenyl-p-methoxy-cinnamic nitrile instead of α-phenyl-cinnamic acid nitrile according to Example 1, α-phenyl-p-methoxy-dihydro-cinnamic nitrile, melting at 88° C., is obtained, which may be converted into α-phenyl-p-methoxy-dihydro-cinnamic acid melting at 121° C. This last-mentioned product yields α-phenyl-p-methoxy-dihydro-cinnamic acid chloride, melting at 66-68° C., when treated with thionyl chloride, from which 4-methoxy-stilbane-α'-diazo ketone, melting at 74° C. may be obtained by treatment with diazomethane, which upon decomposition in an acid medium, yields 4-methoxy-stilbane-α'-ketol, (1-hydroxy-2-oxo-3-phenyl-4-anisyl-butane), melting at 39° C. (after recrystallization from methanol).

*Example 3*

By treating α-p-anisyl-p-methoxy-cinnamic nitrile according to Example 1, α-p-anisyl-p-methoxy-dihydro-cinnamic nitrile, melting at 117-118° C., is formed from which α-p-anisyl-p-methoxy-dihydro-cinnamic acid, melting at 125-126° C., is obtained. This product, upon treatment with thionyl chloride yields α-p-anisyl-p-methoxy-dihydro-cinnamic acid chloride, melting at 64-66° C., which may be converted through the intermediate 4:4'-dimethoxy-stilbane-α-diazoketone, melting at 86-87° C., into 4:4'-dimethoxy-stilbane-α-ketol (1-hydroxy-2-oxo-3:4-dianisyl-butane), melting at 50-52° C. after recrystallization from methanol.

Having thus described the subject matter of the invention what is desired to secure by Letters Patent is:

1. A substance of the class consisting of the stilbane alpha ketol compounds represented by the formula:

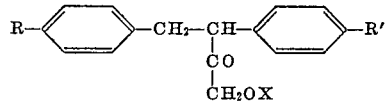

wherein R and R' are of the group consisting of hydrogen, hydroxy, alkoxy, alkoxymethoxy and acyloxy; and X is of the group consisting of hydrogen and acyl.

2. As a new chemical compound, 1-hydroxy-2-oxo-3:4-di-p-anisyl-butane.

3. The process that comprises reacting a stilbane nitrile represented by the formula:

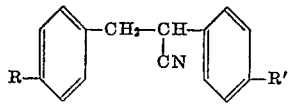

wherein R and R' are of the group consisting of hydrogen, hydroxy, methoxy, methoxymethyleneoxy and acetoxy, with a hydrolyzing agent whereby the stilbane nitrile is converted to the corresponding stilbane carboxylic acid, treating this carboxylic acid with thionyl chloride to obtain the corresponding stilbane carboxylic acid chloride, reacting this carboxylic acid chloride with diazomethane in ethereal solution to produce the corresponding diazoketone, decomposing the diazoketone with aqueous acid, and recovering from the reaction mixture the corresponding stilbane alpha-ketol of the formula:

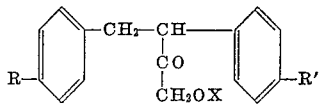

wherein R and R' have the meaning above assigned and X is chosen from the group consisting of hydrogen and acyl.

References Cited in the file of this patent

UNITED STATES PATENTS

| Number | Name | Date |
| --- | --- | --- |
| 2,307,700 | Moore | Jan. 5, 1943 |

OTHER REFERENCES

Oglialoro: Beilstein (Handbuch, 4th ed.), vol. 9, page 678 (1926).

Beilstein "Handbuch der Organ. Chem. (1927), vol. X, p. 448, item 5.

Pfeiffer et al.: Beilstein (Handbuch, 4th ed. 2nd sup.), vol. 9, pp. 473, 482, 483 (1949).